United States Patent [19]

Bacardit

[11] 4,217,932
[45] Aug. 19, 1980

[54] HYDRAULIC ROTARY DISTRIBUTOR, PARTICULARLY FOR USE IN POWER STEERING MECHANISMS

[75] Inventor: Juan S. Bacardit, Barcelona, Spain

[73] Assignee: The Bendix Corporation, Southfield, Mich.

[21] Appl. No.: 61,540

[22] Filed: Jul. 27, 1979

[30] Foreign Application Priority Data

Jul. 27, 1978 [ES] Spain .................................... 72.088

[51] Int. Cl.² .......................................... F16K 11/02
[52] U.S. Cl. ............................ 137/625.21; 91/375 R; 91/467; 180/132
[58] Field of Search ........................ 137/625.21, 596; 91/385, 386, 387, 467, 375; 180/132, 146, 147; 60/393

[56] References Cited

U.S. PATENT DOCUMENTS 1,947,991  2/1934  Jessup ............................ 91/375 X
3,227,178  1/1966  Elwell ........................... 137/625.21

Primary Examiner—Edgar W. Geoghegan
Attorney, Agent, or Firm—Paul David Schoenle; Ken C. Decker

[57] ABSTRACT

A hydraulic rotary distributor comprising two rotary members respectively connected to an input shaft and to an output shaft, said members controlling through their relative angular position the supply of pressurized fluid to a hydraulic power-assistance motor. According to the invention, there are provided, in addition to the usual working chambers, additional reaction chambers which are fed with the same fluid pressure as the corresponding working chambers, the pressure in said reaction chambers being however limited to a predetermined maximal value thanks to devices automatically controlling the communications between said working and reaction chambers. For use particularly in power steering mechanisms for automotive vehicles.

16 Claims, 14 Drawing Figures

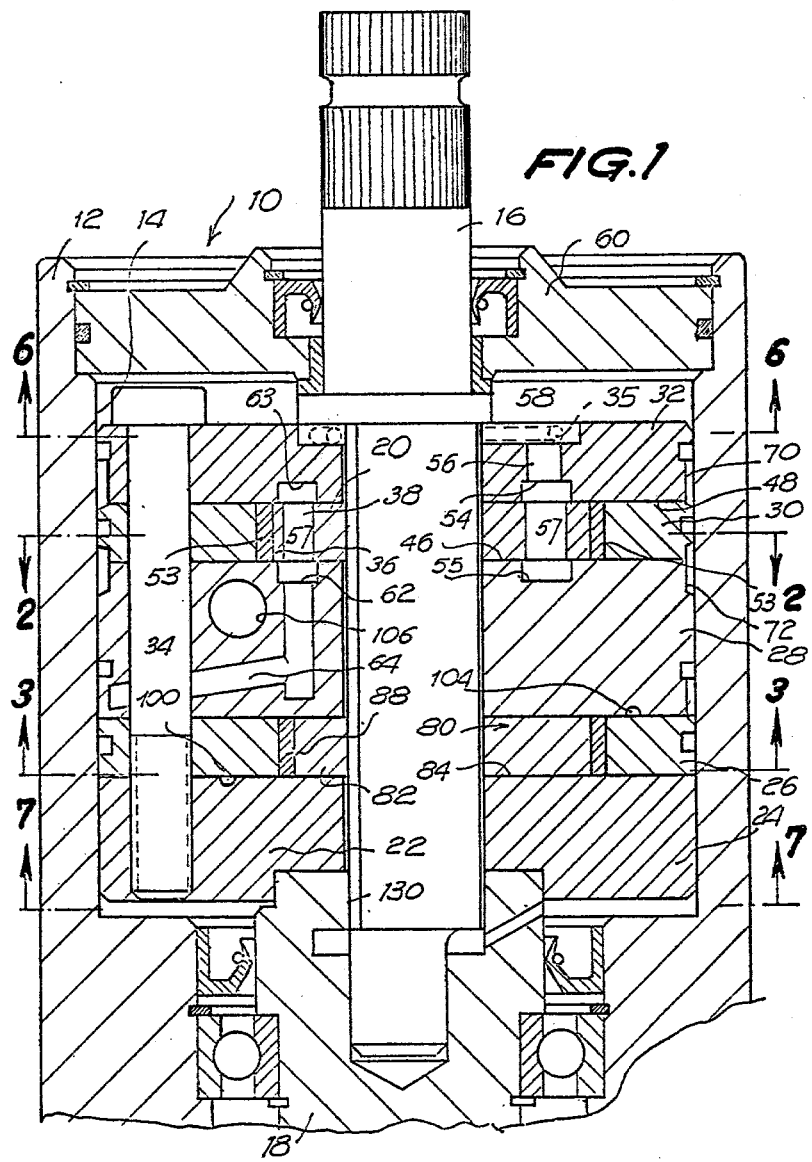

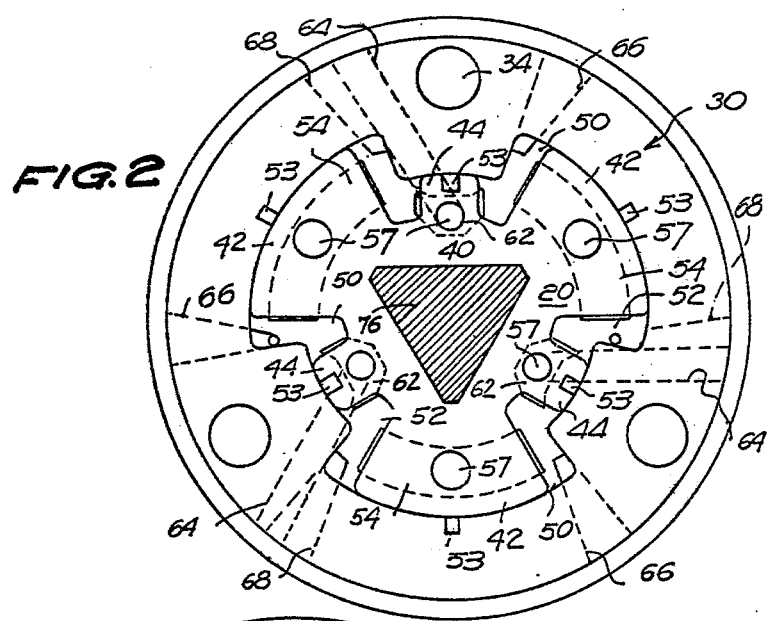
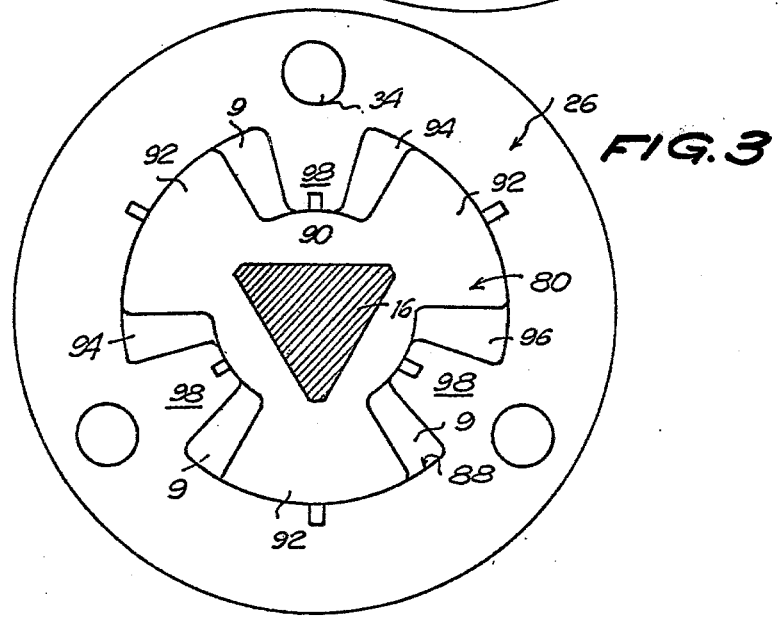

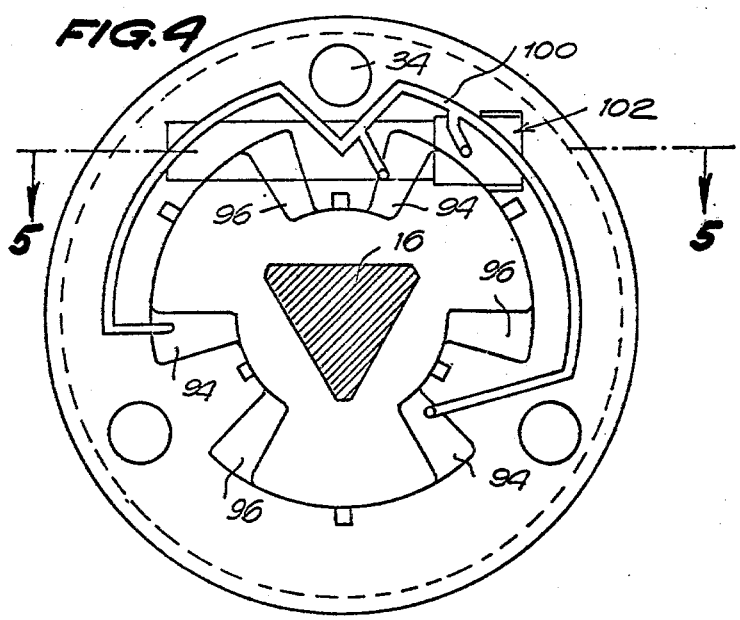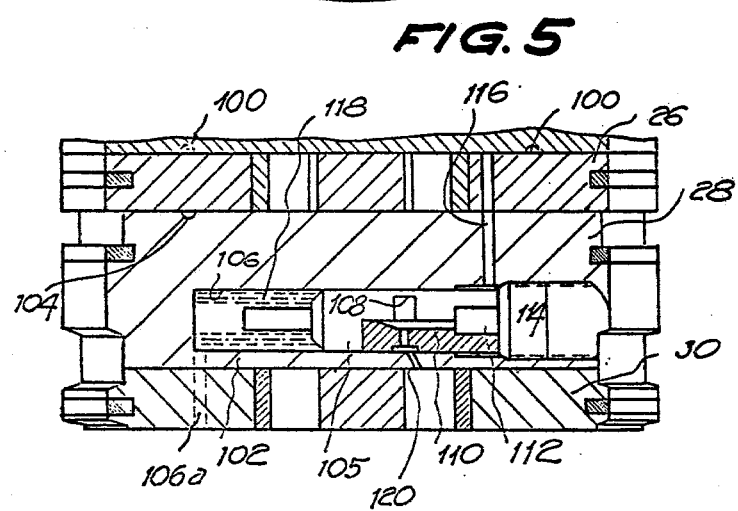

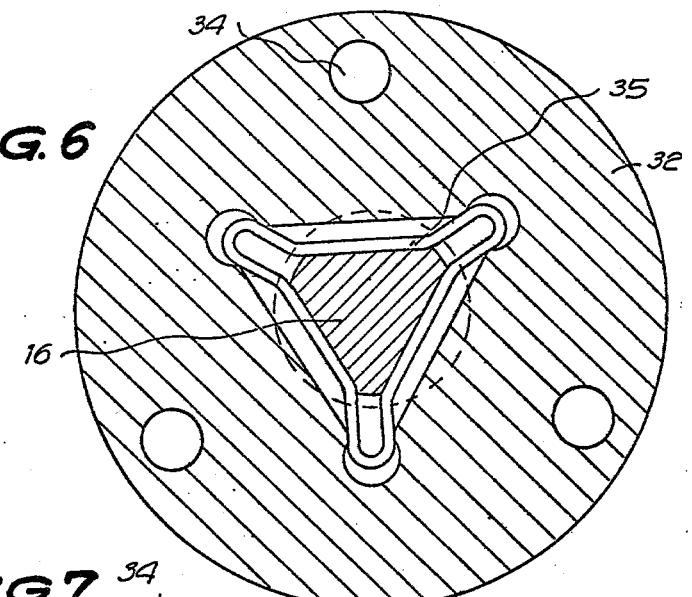
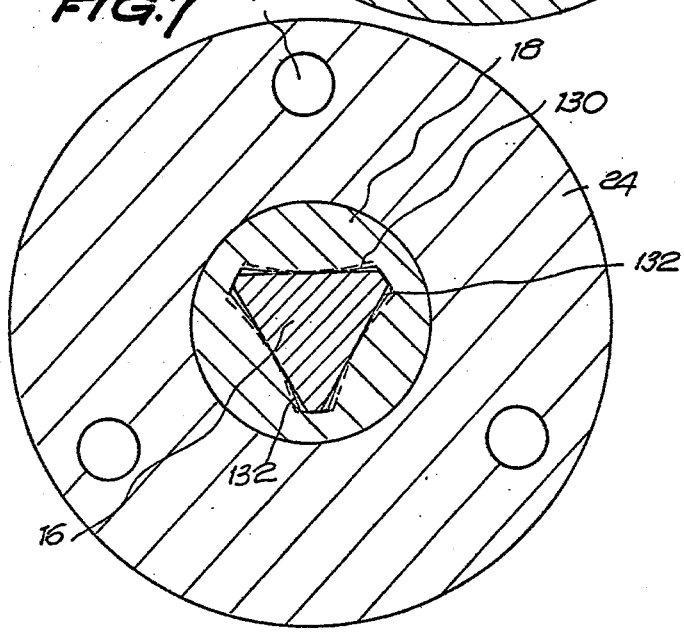

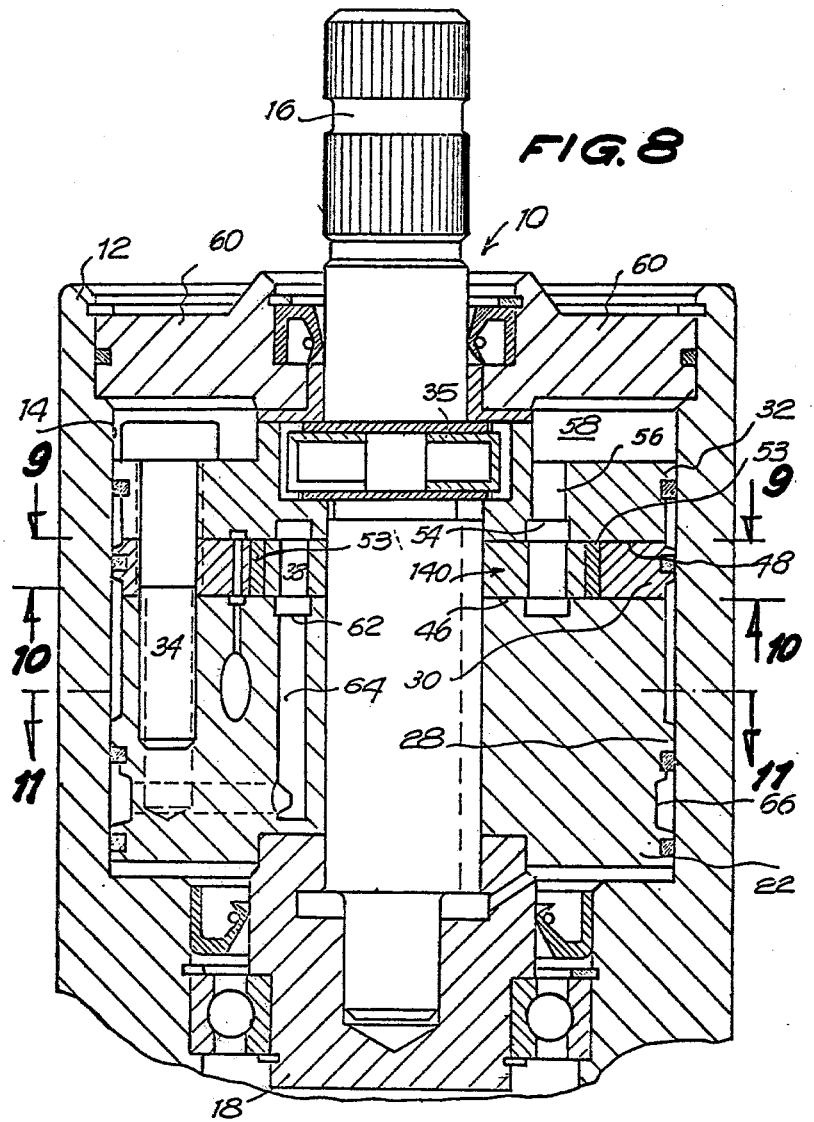

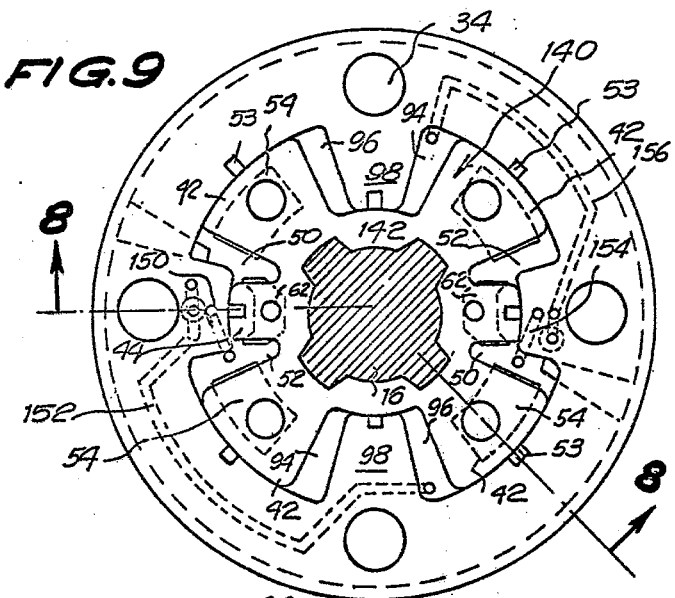

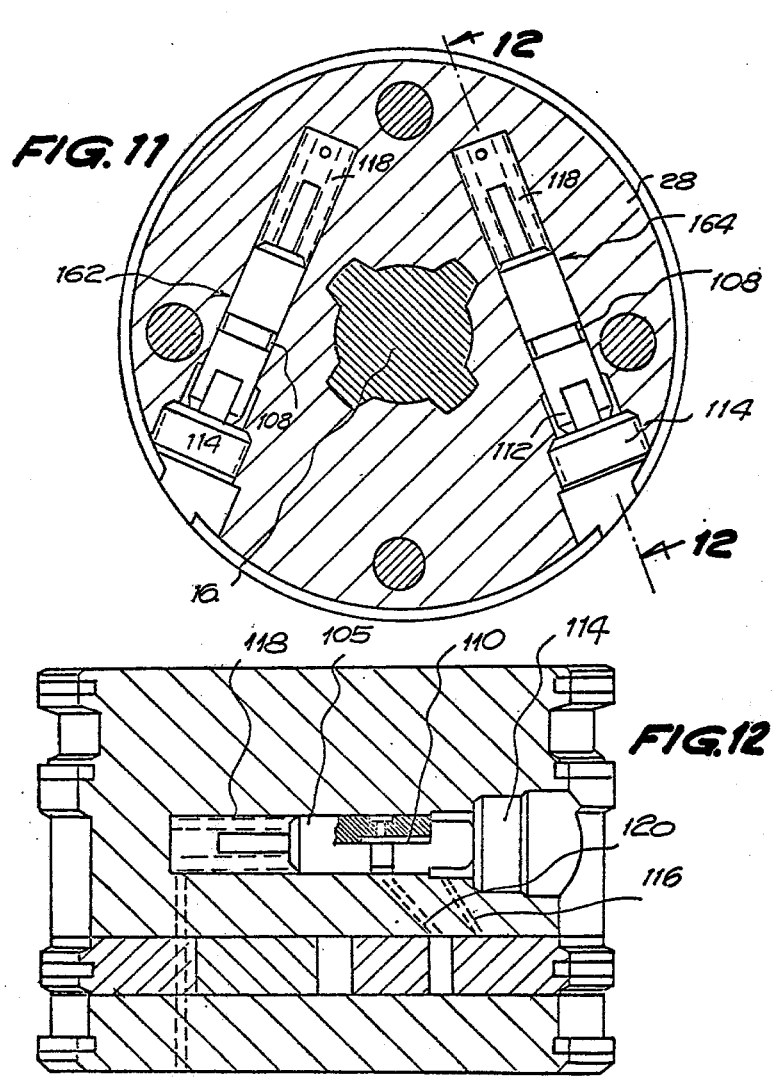

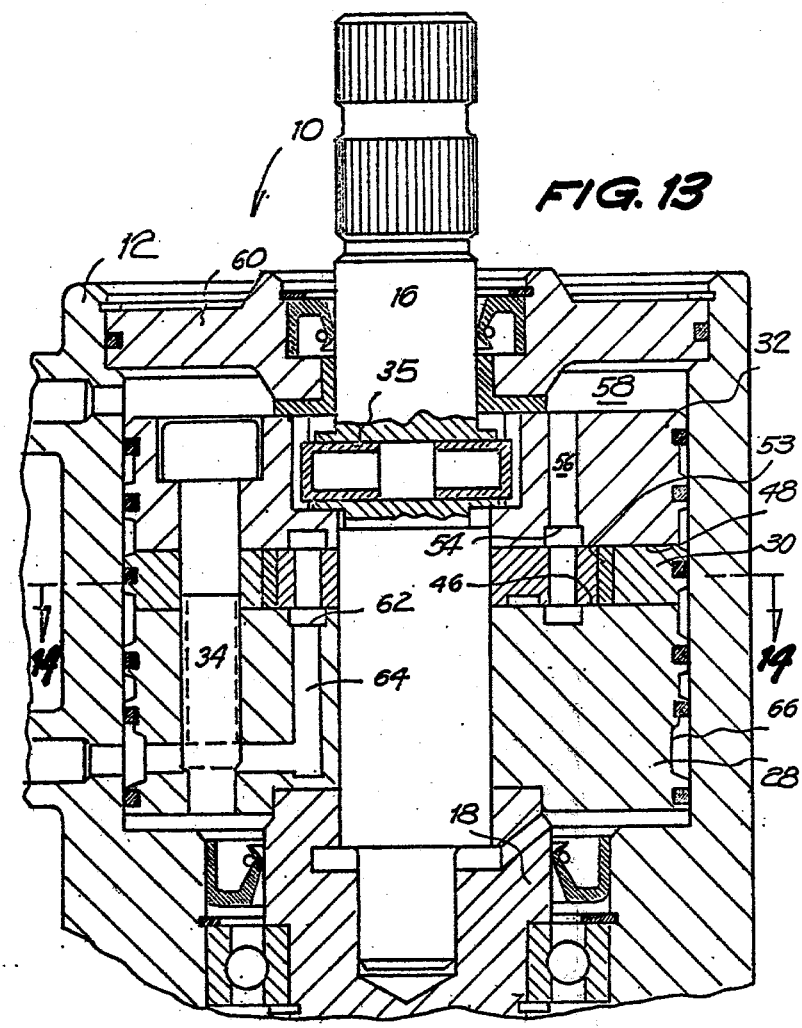

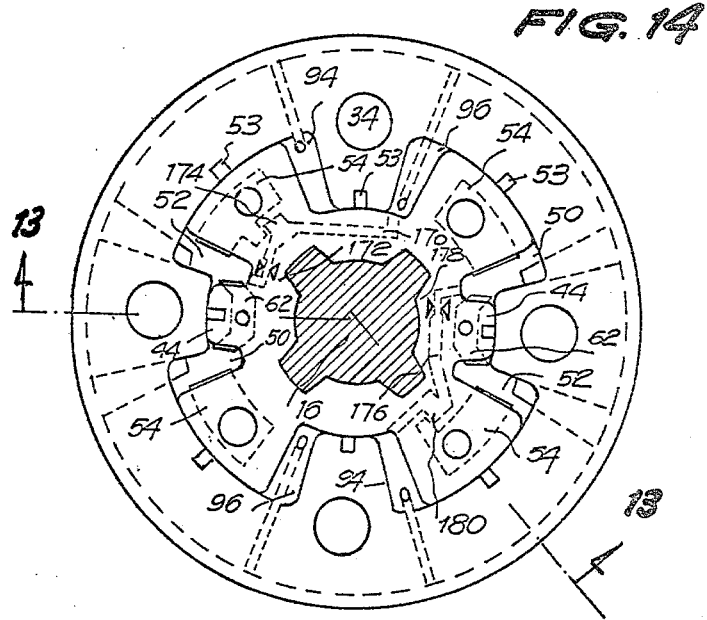

HYDRAULIC ROTARY DISTRIBUTOR, PARTICULARLY FOR USE IN POWER STEERING MECHANISMS

The present invention concerns a hydraulic rotary distributor, particularly for use in a power-assisted steering gear.

Power-assisted steering gears are known, comprising a hydraulic rotary distributor intended to control communication between a source of pressure comprising a high pressure orifice and a low pressure orifice and the compartments of a double-action hydraulic motor. The rotary distributor conventionally comprises a first rotary member connected to an input shaft intended to be driven by a steering control member, and a second rotary member intended for connection to the steering gear. Between the first and second rotary members are defined at least one pair of working chambers each comprising a first and a second working chamber respectively connected to a first compartment and a second compartment of a hydraulic power-assistance motor connected to the steering gear. In response to a relative rotation of the first and second rotary members, one of the working chambers of each pair is connected to the high pressure orifice of the pressure source while the other working chamber is connected to the low pressure orifice of the said source. The difference in pressure thus created in the hydraulic motor causes a power-assistance force at the level of the said motor and this force is transmitted to the steering gear.

The performances of hydraulic distributors for power-assisted steering are often a function of the shape of a curve called "characteristic curve" and which represents the driving pressure of the hydraulic power-assistance motor as a function of the control torque applied to the input shaft. This curve is preferably parabolic in shape but, in practice, it is approximated by a curve comprising three, substantially linear adjacent parts corresponding respectively to driving in a straight line, cornering and parking manoeuvres. The transition between the second and third parts is particularly characterised by a relatively large change in slope of the characteristic curve from a given value of the input torque.

The object of the present invention is to propose a hydraulic distributor, particularly for power-assisted steering gear, in which are provided means generally allowing modification of the course of the characteritic curve as a function of the wishes of the manufacturer of the vehicle, and more particularly allowing determination in a simple way of the slopes of the parts of the curve respectively corresponding to cornering and parking, as well as the value of the input torque corresponding to the point of transition between these two parts.

To do this, according to the gist of the present invention, the distibutor comprises means allowing the creation at the level of the input shaft of a hydraulic reaction proportional to the working pressure in the hydraulic motor, and opposing the relative rotation of the first and second rotary members, and this hydraulic reaction increases until it reaches a limiting value proportional to a limiting pressure, after which the hydraulic reaction is maintained at the said limiting value when the working pressure is greater than the limiting pressure.

According to a preferred embodiment of the invention, the distributor also comprises, in combination with the first means, second means intended to create an additional hydraulic reaction at the level of the input shaft also proportional to the working pressure in the hydraulic motor and opposing the relative rotation of the first and second rotary members. Thus, as long as the working pressure is less than the limiting value, the two hydraulic reactions increase. When the working pressure exceeds the limiting value, only the reaction caused by the second means continues to increase, which involves a modification of the slope of the torque-pressure curve, and this operating phase then corresponds to parking manoeuvres.

The hydraulic distributor according to the invention comprises a housing inside which are disposed a first rotary member, connected to an input shaft, and a second rotary member, coaxial with the first rotary member and connected to an output shaft, between which are defined at least one pair of working chambers comprising a first working chamber intended to be put into communication with a first compartment of a double-action hydraulic motor, and a second working chamber intended to be put into communication with the second compartment of the said motor, the said distributor being responsive to a relative rotation of one of the rotary members in relation to the other from a non-operating position so as to put one of the first or second working chambers in communication with a high pressure source and to put the other working chamber in communication with a low pressure source, the said distributor being more particularly characterized in that it comprises a rotary element solid in rotation with one of the input or output shafts and cooperating with the rotary member connected to the other input or output shaft so as to define at least one pair of reaction chambers comprising a first reaction chamber connected to the first working chamber, and a second reaction chamber connected to the second working chamber, the reaction chambers being disposed in such a way that the high pressure transmitted to the first or second reaction chamber via its associated working chamber in response to the relative rotation of one of the rotary members in relation to the other opposes the said relative rotation, the said distributor also comprising a first control device disposed between the first working chamber and the first reaction chamber in order to limit the fluid pressure in the first reaction chamber to a predetermined maximal value, and a second control device disposed between the second working chamber and the second reaction chamber in order to limit the fluid pressure in the second reaction chamber to the said maximal value.

The invention will now be explained in detail and its advantages will appear in the light of the description which follows and which refers to the attached drawings in which:

FIG. 1 is a fragmentary longitudinal section of a first embodiment of the distributor according to the invention;

FIG. 2 is a view in section at the line 2—2 of FIG. 1;

FIG. 3 is a view in section at the line 3—3 of FIG. 1;

FIG. 4 is a diagrammatic view in which are represented a certain number of passages establishing communication between the working chambers and the reaction chambers;

FIG. 5 is a view in section at the line 5—5 of FIG. 4, which illustrates one particular embodiment of a cut-off valve disposed between the working chambers and the reaction chambers;

FIG. 6 is a view in section at the line 6—6 of FIG. 1;

FIG. 7 is a view in section at the line 7—7 of FIG. 1;

FIG. 8 is a fragmentary longitudinal section of a second embodiment of the distributor according to the invention;

FIG. 9 is a view in section at the line 9—9 of FIG. 8;

FIG. 10 is a view in section at the line 10—10 of FIG. 8;

FIG. 11 is a view in section at the line 11—11 of FIG. 8;

FIG. 12 is a view in section at the line 12—12 of FIG. 11;

FIG. 13 is a fragmentary longitudinal section of a third embodiment of the distributor according to the invention; and FIG. 14 is a view in section at the line 14—14 of FIG. 13.

With reference now to FIGS. 1 to 7, a rotary distributor for power-assisted steering is designated in a general way by the reference 10 and comprises a housing 12 inside which is provided a bore 14 in which are disposed coaxially an input shaft 16 and an output shaft 18. The input shaft 16 is intended to be connected to a control member for steering the vehicle, and the output shaft 18 is intended to be connected to the steering gear. In the bore 14 are disposed a first rotary member 20 solid in rotation with the input shaft 16 and a second rotary member 22 solid in rotation with the output shaft 18. The second rotary member 22 is constituted by five annular parts 24, 26, 28, 30, 32 disposed in this order from foot to top in FIG. 1 and locked together by axial connection means 34 such as screws or similar elements. These five annular parts are capable of rotating in the bore 14 solidly with the output shaft 18. In addition, a resilient centring means (whose use is optional), constituted by a spring 35, is interposed between the input shaft 16 and the annular part 32. This spring is intended to afford a mechanical centring and exerts a restoring torque in response to the setting in rotation of the input shaft. The annular part 30 disposed between the annular parts 28 and 32 is crown-shaped so as to define a central aperture limited by a cylindrical internal wall 36. The parts 28 and 32 and the intermediate part 30 thus cooperate so as to define a substantially disk-shaped cavity 38 traversed along its axis of symmetry by the input shaft 16.

The rotary member 20 is mounted for rotation in the cavity 38. It comprises a rotor with a central hub 40 from which project radially outwardly a plurality of arms which cooperate with the walls of the said cavity 38 so as to divide the latter into a certain number of chambers which will be described in more detail later in the description. The arms of the rotor 20 comprise a first group of arms 42 of great length whose ends have a portion of cylindrical surface of large radius of curvature sealingly cooperating with a facing cylindrical surface portion of the cylindrical interior wall 36. The arms of the rotor 20 also comprise a second group of arms 44 shorter than the arms 42 and whose ends have a cylindrical surface portion of smaller radius of curvature sealingly cooperating with a facing cylindrical surface portion of the cylindrical interior wall 36. The arms 42 and 44 of the rotor are distributed alternately around the hub 40 and cooperate with the end faces 46 and 48 and the exterior wall 36 of the cavity 38 so as to divide the latter into a plurality of working chambers 50, 52 grouped two by two and provided so as to be respectively connected to the first and second compartments of a double-action hydraulic power-assistance motor (not represented). Seals 53 suitably disposed in the grooves of the cylindrical wall or at the ends of the arms of the rotor ensure sealed separation between the consecutive working chambers of the cavity. When the system is in non-operating position, each of the arms 42 covers an orifice 54 defined in the wall 48 and which communicates with a low pressure orifice (not represented) of the housing, via a passage 56 in the annular part 32 and an annular chamber 58 defined between the part 32 and the cover 60 of the housing 12. In the same way, each arm 44 covers an opposite orifice 62 defined in the wall 46 of the part 28 and communicating with a high pressure orifice (not represented), via a passage 64 and a groove 66 in the annular part 28. Each of the orifices 54 and 62 is furthermore respectively in communication with a complementary cavity 55 and 63 defined in the walls 46 or 48, via axial passages 57 formed in the arms of the rotor 20. When the distributor is in nonoperating position, the arms 42 and 44 do not totally cover the apertures 54 and 62 so as to allow a small communication of fluid between each chamber 50 and 52 and the high pressure and low pressure orifices. When the rotor 20 starts rotating in the cavity 38, the distributor acts as an open-centred valve of conventional type so as to cause an increase in pressure in the working chambers (the chambers 50, for example) in communication with one of the compartments of the power-assistance hydraulic motor, while the working chambers in communication with the other compartment (the chambers 52) are in unrestricted communication with the low pressure orifice. It will be noted that, to make the drawings easier to understand, there has been represented in dotted lines in FIG. 2 a certain number of passages for fluid which are not situated in the plane of section, such as the passages 64, and also the respective outlet passages 66 and 68 of the working chambers 50 and 52, which communicate with the annular grooves 70 and 72 of the rotary member 22, which are respectively connected to the first and second compartments of the hydraulic motor.

The hydraulic distributor also comprises a rotary element 80 solid in rotation with the input shaft 16 and cooperating with the rotary member 22 so as to define with the latter a plurality of reaction chambers whose structure and function will be explained in more detail later in the description. The rotary element is here constituted by another rotor fixed on the input shaft 16 and disposed rotatively in a substantially disk-shaped cavity 82, limited by the opposite faces 84 and 86 of the parts 24 and 28 and by the internal cylindrical wall 88 of the crown-shaped part 26. With reference more particularly to FIG. 3, the rotor 80 is star-shaped and comprises a central hub 90 from which project several arms 92 radially oriented and whose ends have portions of cylindrical surface capable of sealingly sliding on the surface 88. The arms 92 divide the cavity into a plurality of compartments limited by the exterior cylindrical edge of the hub 90 and the interior cylindrical edge of the cavity. Each compartment is itself divided into a first 94 and a second 96 reaction chamber by a dividing arm 98 projecting radially from the part 26 and sealingly cooperating with the exterior cylindrical edge of the hub 90. The reaction chambers 94 are normally in communication with the working chambers 50. Similarly, the reaction chambers 96 are normally in communication with the working chambers 52. It will be noted that, in FIG. 3, a groove 100 intended to feed the reaction chamber with fluid under pressure has deliberately not been shown. This groove will be described with reference to FIG. 4.

With reference now to FIG. 4, a view similar to that in FIG. 3 has been represented in which the fluid passage feeding the reaction chambers 94 has been shown, being here constituted by the groove 100, previously mentioned, which is provided in the face 84 of the part 24 and connected to the working chambers 50 by passages provided in the parts 26 and 28. A control device is disposed in the flowpath of the fluid between one of the working chambers 50 and the groove 100 so as to limit the pressure of the fluid transmitted to the reaction chamber to a predetermined maximal value. This control device is here constituted by a cut-off valve incorporated in the part 28 and diagrammatically designated by the reference 102 in FIG. 4. Of course, if FIG. 4 is referred to in connection with FIG. 1, it will be realised that the cut-off valve 102 which is mounted in a blind bore 106 of the part 28 is disposed in front of the plane of section of FIG. 4. Similarly, the reaction chambers 96 are connected to the working chambers 52 by a groove 104 defined in the face 86 of the part 28 and by a fluid passage in the part 28, with a cut-off valve (not represented in FIG. 4) identical to the cut-off valve 102 disposed in the said fluid passage.

With reference now to FIG. 5, which represents a view in section at the line 5—5 of FIG. 4, the cut-off valve 102 incorporated in the part 28 is shown in detail. The valve 102 comprises a slide 105 mounted in the blind bore 106 of the part 28. The slide 105 comprises an annular groove 108 in communication with a central passage 110 which opens into an outlet chamber 112 closed by a plug 114. The outlet chamber 112 is in communication with the groove 100 via a passage 116. In non-operating position, the slide is urged against the plug 114 by the influence of a spring 118 disposed at the bottom of the blind bore. The annular groove 108 is then situated opposite a passage 120 in communication with the working chambers 50.

The working chambers 50 and the reaction chambers 94 are then in communication. If, in response to a relative rotation of the input shaft 16 in relation of the output shaft 18, the pressure increases in the working chambers 50, this increase in pressure is transmitted to the reaction chambers 94 and the working pressure then causes at the level of the rotors 20 and 80 hydraulic reactions which are added together and which increase as a function of the high pressure which is transmitted to the working chambers.

When the working pressure has reached a predetermined limiting value sufficient to move the slide against the spring 118, the communication of fluid between the working chambers 50 and the associated reaction chambers 94 is interrupted. If the working pressure continues to increase beyond this limiting value, the pressure in the reaction chambers 94 no longer changes and the increase in the working pressure only causes an increase in the hydraulic reaction at the level of the rotor 20.

Since a given input torque corresponds to the predetermined limiting pressure, the hydraulic reaction at the level of the rotor 80 ceases to increase, as a consequence, for values of torque greater than the given input torque. This translates into a considerable increase in the slope of the characteristic of the distributor from the instant when the input torque becomes greater than the said given value which determines the point of transition between the part of the characteristic corresponding to cornering and the adjacent part which corresponds to parking manoeuvres.

It is quite clear that the second cut-off valve (not represented) identical to the first cut-off valve 102 is also incorporated in the part 28. This second cut-off valve functions identically in the case of increase in the pressure in the working chambers 52 and in the reaction chambers 96. So the characteristic of the hydraulic distributor is perfectly symmetrical.

With reference now to FIG. 6 which is a view in section at the line 6—6 of FIG. 1, the spring 35 to be seen there is constituted by a closed loop, triangular in shape, rigidly fixed on the input shaft 16 whose section is also triangular in shape. At the apices of the triangular resilient loop are formed three protuberances which become firmly fixed in corresponding recesses of the annular part 32.

In FIG. 7, which is a view in section at the line 7—7 of FIG. 1, the input shaft 16 of triangular section can be seen, which goes into an aperture 130 in the output shaft 18. A limited rotation of the shaft 16 is allowed in the aperture 130, until the faces 132 come into contact with the edges of the apertures 130 so as to ensure a direct mechanical drive between the input shaft and the output shaft in the case of a breakdown in power-assistance.

FIGS. 8 to 12 represent another embodiment of the invention whose structure is substantially similar to that of the distributor according to FIGS. 1 to 7, except for the fact that the rotors 20 and 80 have been replaced by a single, star-shaped rotor which is mounted for rotation in a disk-shaped cavity in the rotary member fixed for rotation with the output shaft. For the sake of simplicity, the elements in FIGS. 8 to 12 which are identical or similar to those in FIGS. 1 to 7 have been allotted the same numerical references.

With reference more particularly to FIG. 8, the rotary member 22 solid with the output shaft 18 is here constituted solely by three annular parts 28, 30 and 32, fixed by connecting elements 34. A disk-shaped cavity 38 is defined inside the rotary member and a rotor 140 fixed to the input shaft is capable of entering into rotation in the cavity 38 in response to the driving of the input shaft 16.

FIG. 9, which is a view in section at the line 9—9 of FIG. 8, shows in more detail the shape of the rotor 140 and its cooperation in rotation with the cavity 38. The rotor 140 comprises a central hub 142 from which project radially outwards a plurality of arms 42, 44 which cooperate with the walls of the cavity 38 so as to define, firstly, a plurality of working chambers divided into a group of first working chambers 50 and into a group of second working chambers 52 and, secondly, a plurality of reaction chambers also separated into a group of first reaction chambers 94 and a group of second reaction chambers 96.

More precisely, the arms of the rotor divide the cavity into a plurality of spaces, two of which are divided in a sealed way by arms 98 projecting radially into the cavity from the part 30 so as to define the reaction chambers 94 and 96. The other spaces of the cavity situated between the arms of the rotor constitute the working chambers 50 and 52 which are distributed alternately around the hub. Each pair of workings chambers 50, 52 is constituted by intermediate spaces defined in the cavity and edged by a central arm 44 and by two side arms 42 immediately adjacent to the central arm. According to the embodiment in FIG. 8, the so-called central arms 44 are shorter than the so-called side arms 42 in such a way that the pressure created in the working chambers 50 or the working chambers 52 causes a hydraulic reaction on the rotor 142. As with the hydraulic distributor in FIGS. 1 to 7, the arms 42 and 44 cooperate with the apertures 54 and 62 respectively in communication with a low pressure orifice and a high pressure orifice. In FIG. 9, fluid passages 150 and 152 intended to put one of the working chambers 52 into communication with one of the reaction chambers 96 have also been represented in dotted lines. The passage 150 is directly in communication with the working chamber 52 and the passage 152 is directly in communication with the reaction chamber 96. A cut-off valve (not represented), incorporated in the rotary member 22 and substantially identical to that represented in FIG. 5, is disposed between the passages 150 and 152.

In the same way, passages 154 and 156 are respectively in communication with one of the working chambers 50 and one of the reaction chambers 94 with a cut-off valve identical to the preceding ones disposed between the said passages. Of course, the passages 150, 152, 154 and 156 are not entirely situated in the plane of section in FIG. 9, and have only been represented there to make the structure of the distributor easier to understand. It will be further noted that FIG. 8 is a view in section at the line 8—8 of FIG. 9.

FIG. 10 is a view in section along the line 10—10 of FIG. 8, and also shows the division of the cavity 38 into working chambers 50, 52 and reaction chambers 94 and 96. Passages 158 and 160 intended to feed the two other reaction chambers 94 and 96 with fluid under pressure coming from their corresponding cut-off valves have also been represented there in dotted lines.

FIGS. 11 and 12 illustrate the introduction of the cut-off valves 162 and 164 respectively disposed between the first working chambers 50 and the first reaction chambers 94 and between the second working chambers 52 and the second reaction chambers 96. Each of the cut-off valves has a similar structure to the valve described with reference to FIG. 5 and the elements identical to those in FIG. 5 are designated by the same numerical references.

The functioning of the distributor illustrated in FIGS. 8 to 12 is virtually identical to that illustrated in FIGS. 1 to 7. For example, in the case of rotation of the rotor 140 in the clockwise direction, with reference to FIG. 9, the high pressure is established in the working chambers 52 and also in the reaction chambers 96 and a hydraulic reaction is produced, proportional to the high pressure and tending to oppose the rotation of the rotor 140. When the high pressure exceeds the cut-off pressure of the valve 162, the latter closes and the increase in pressure is no longer transmitted but only to the working chambers 52, with a consequent lessening of the rate of increase of the hydraulic reaction as a function of the pressure and an increase in the slope of the characteristic of the distributor. The distributor functions identically in the case of the rotation of the rotor 140 in the counter-clockwise direction. In this case, the working chambers 50 and the reaction chambers 94 are fed at high pressure and the cut-off valve interrupts communication between the two series of chambers when the high pressure exceeds the predetermined limiting value.

It will be noted that, although the embodiments of the distributor described hereinabove comprise cut-off valves incorporated inside the rotary member 22 connected to the output shaft 18, the invention also applies to hydraulic distributors of similar structure in which the cut-off valves would be disposed externally to the housing 12 and fed by external pipes.

In addition, although the cut-off valves described have a cut-off pressure determined by the tension of the springs 118, it is as equally conceivable that the cut-off pressure could be modified, according to the requirements of the user, or as a function of characteristic parameters of the operation of the vehicle. To do this, it would be sufficient to apply to the slides 105 a pressure or a modified force intended to counterbalance the effect of the pressure in the outlet chamber 112, in the same way as the springs 118.

Furthermore, although the distributors according to FIGS. 1 to 12 are of the open-centre type, it is quite clear that the invention applies equally as well to closed-centre distributors. In this case, it is sufficient that, in the non-operating position of the rotor disposed in the cavity 38, the arms 42 totally cover the apertures 54, and the arms 44 totally cover the apertures 62.

FIGS. 13 and 14 represent a third embodiment of the distributor according to the invention, in which the devices for control of the fluid communication between the working chambers 50, 52 and the reaction chambers 94, 96 which are associated with them no longer work by cut-off valves. The elements in FIGS. 13 and 14 which are identical or similar to those in FIGS. 8 to 12 are designated by the same numerical references. A groove 170 formed in one of the faces of the rotor defines a fluid passage between one of the working chambers 52 and one of the reaction chambers 96. The fluid passage is divided into an upstream part in communication with the working chamber 52 and a downstream part in communication with the reaction chamber 96, via a constriction 172. The downstream part comprises a leakage passage here constituted by a notch 174. When the star-shaped rotor is in its non-operating position, the leakage passage is closed by the face 46 of the part 28. When the rotor moves in rotation in the counter-clockwise direction by an angle with a value greater than a predetermined value, the leakage passage constituted by the notch 174 is put progressively into communication with a source of low pressure. To do this, the notch 174 is provided so as to come to cover the orifice 54. In addition, the notch 174 or the orifice 54 may have a chamfer intended to modulate the section of the leakage passage as a function of the angular position of the rotor.

The functioning of the cut-off device is effected in two stages: in a first stage, the rotor moves by an angular amount less than the predetermined value. The high pressure prevailing in the working chamber 52 is fully transmitted to the reaction chamber 96. If the rotation of the rotor increases so that the angular separation in relation to the non-operating position exceeds the predetermined value, the leakage passage is then open and the restriction and the chamfer are calculated so that the pressure in the reaction chamber 96 no longer increases, despite the increase in the pressure in the working chamber 52. Given that the reaction chambers 96 are connected together, the pressure of the latter is then consequently limited to a maximum value.

In an identical way, one of the working chambers 50 and one of the reaction chambers 94 are connected by a fluid passage constituted by another groove 176 in the face of the star rotor. The fluid passage comprises a constriction 178 and an identical leakage passage constituted by a notch 180 identical to the notch 174, and which cooperates with the orifice 54 opposite.

To conclude the description, it will be stated that in the embodiments described, a certain number of orifices 54 and 62 and fluid passages hve been represented on the same plane, although such a representation does not correspond to reality, and has only been used with the object of making the structure and functioning of the hydraulic distributors easier to understand.

It will be noted that the constituent parts of the valves according to the present invention can be obtained with simple and relatively cheap manufacturing methods such as sintering, for example. In addition, the structure of the valve allows easy mounting and introduction into the steering box of the vehicle without great modification of the latter.

Finally, it will be noted that the device according to the invention is not limited to the use of a single reaction device capable of being controlled by pressure up to a predetermined limiting value. Quite on the contrary, when one wants to obtain a distributor characteristic presenting a greater number of adjacent linear parts it is possible to use a suitable number of reaction devices whose respective cut-off pressures each correspond to a point of transition of the said characteristic.

What I claim is:

1. A hydraulic rotary distributor for power-assisted steering gear, comprising a housing inside which are disposed a first rotary member connected to an input shaft, and a second rotary member, coaxial to the first rotary member and connected to an output shaft, between which are defined at least one pair of working chambers comprising a first working chamber intended to be put into communication with a first compartment of a double-action hydraulic motor and a second working chamber intended to be put into communication with the second compartment of the said motor, the said distributor being responsive to a relative rotation of one of the rotary members in relation to the other from a non-operating position so as to put one of the first and second working chambers in communication with a source of high pressure and so as to put the other working chamber in communication with a source of low pressure, the said distributor further comprising at least one rotary element solid in rotation with one of said shafts and cooperating with the rotary member connected to the other of said shafts so as to define at least one pair of reaction chambers comprising a first reaction chamber connected to the first working chamber, and a second reaction chamber connected to the second working chamber, the reaction chambers being disposed in such a way that the high pressure transmitted to one of said first and second reaction chambers via its associated working chamber in response to the relative rotation of one of the rotary members in relation to the other opposes said relative rotation, said distributor also comprising a first control device disposed between the first working chamber and the first reaction chamber so as to limit the fluid pressure in the first reaction chamber to a predetermined maximal value, and a second control device disposed between the second working chamber and the second reaction chamber so as to limit the fluid pressure in the second reaction chamber to the said maximal value.

2. A hydraulic rotary distributor according to claim 1, wherein the rotary element is constituted by a first star-shaped rotor comprising a central hub solid in rotation with the input shaft and a plurality of arms projecting radially outwards from the hub, said rotor being mounted for rotation in a first disk-shaped cavity in the rotary member connected to the output shaft, each of the spaces of the cavity between two consecutive arms being divided by a radial dividing arm solid with the rotary member connected to the output shaft into two chambers constituting a first and a second reaction chamber, each of the first reaction chambers being capable of receiving a fluid pressure acting on the arms of the rotor so as to urge it into rotation in a first direction and each of the second reaction chambers being capable of receiving a fluid pressure acting on the arms of the rotor so as to urge the latter into rotation in the second direction.

3. A hydraulic rotary distributor according to claim 2, wherein the first rotary member is constituted by a second star-shaped rotor comprising a central hub solid in rotation with the input shaft and a plurality of arms projecting radially outwards from the central hub, said rotor being mounted for rotation in a second disk-shaped cavity defined in the rotary member connected to the output shaft, each of the spaces of the second cavity between two consecutive arms of the second rotor defining a working chamber, said working chambers being distributed angularly in such a way that two consecutive working chambers respectively constitute one of the first working chambers and one of the second working chambers.

4. A hydraulic rotary distributor according to claim 3, wherein two consecutive radial arms of the second rotor have different lengths, so that the pressure prevailing in the working chamber edged by the two arms in response to a relative rotation of the first and second rotary members generates a torque acting on the second rotor.

5. A hydraulic rotary distributor according to claim 1, wherein the first rotary member and the rotary element are constituted by a single star-shaped rotor which comprises a central hub solid in rotation with the input shaft and a plurality of arms projecting radially outwards from the hub, said rotor being mounted for rotation in a substantially disk-shaped cavity defined inside the second rotary member, said arms cooperating with the walls of the said cavity so as to define, firstly, a plurality of working chambers divided into a group of first working chambers and a group of second working chambers and, secondly, a plurality of reaction chambers also divided into a group of first reaction chambers and a group of second reaction chambers.

6. A hydraulic rotary distributor according to claim 5, wherein the arms of the star-shaped rotor divide the cavity into a plurality of spaces, some of these intermediate spaces being sealingly divided into two compartments defining a pair of reaction chambers by an arm projecting radially into the cavity from the second rotary member, the other intermediate spaces forming the first and second working chambers distributed alternately around the hub.

7. A hydraulic rotary distributor according to claim 6, wherein each pair of working chambers is constituted by the respective intermediate spaces defined in the cavity and edged by a so-called central arm and two so-called side arms immediately adjacent to the central arm and situated on both sides of the latter.

8. A hydraulic rotary distributor according to claim 7, wherein each central arm covers a high pressure orifice in communication with the high pressure source and defined in the interior wall of the cavity, and wherein each side arm covers a low pressure orifice also defined in the interior wall of the cavity and in communication with the low pressure source, the fluid communication between the working chambers on the one hand and the high and low pressure source on the other hand being a function of the angular position of the star-shaped rotor in the cavity.

9. A hydraulic rotary distributor according to claim 7, wherein the central arm is shorter in length than the side arms so that the high pressure of fluid at one or the other of the working chambers exerts a hydraulic reaction on the rotor.

10. A hydraulic rotary distributor according to claim 1, wherein the first and second control devices are respectively constituted, firstly, by a first cut-off valve disposed between the first working chamber and the first reaction chamber and, secondly, by a second cut-off valve disposed between the second working chamber and the second reaction chamber, said first and second cut-off valves being designed so as to interrupt the fluid communication between each working chamber and its associated reaction chamber when the pressure in one or the other of the working chambers is greater than said maximal value.

11. A hydraulic rotary distributor according to claim 10, wherein the maximal value is fixed.

12. A hydraulic rotary distributor according to claim 10, wherein the maximal value is variable as a function of operating parameters of the vehicle.

13. A hydraulic rotary distributor according to claim 10, wherein the cut-off valves are incorporated into one of the rotary members.

14. A hydraulic rotary distributor according to claim 5, wherein each control device is constituted by a fluid passage provided in the rotor and connecting a working chamber and the reaction chamber associated with it, said fluid passage comprising a constriction dividing said passage into an upstream part situated between the working chamber and the constriction and a downstream part situated between the constriction and the reaction chamber, a leakage passage being defined from the downstream part of the fluid passage said leakage passage normally being closed when the rotor occupies in relation to its non-operating position an angular position less than a given value, and being opened progressively so as to put the downstream part of the fluid passage in communication with the low pressure source as the angular position increases beyond the given value.

15. A hydraulic rotary distributor according to claim 14, wherein the leakage passage is constituted by a notch defined in one of the faces of the rotor, said notch being in communication with the downstream part of the fluid passage, and being capable of covering over the low pressure orifice defined in the wall of the cavity as the angular position increases beyond the given value, so as to allow a leakage of fluid to the low pressure orifice.

16. A hydraulic rotary distributor according to claim 15, wherein a chamfer is found in the notch so as to modulate the section of the leakage passage as a function of the angular position of the rotor.

* * * * *

UNITED STATES PATENT AND TRADEMARK OFFICE
CERTIFICATE OF CORRECTION

PATENT NO. : 4,217,932

DATED : August 19, 1980

INVENTOR(S) : Juan S. Bacardit

It is certified that error appears in the above-identified patent and that said Letters Patent is hereby corrected as shown below:

On the title page Assignee should read

-- Bendiberica S.A. --

Signed and Sealed this

Twenty-second Day of May 1984

[SEAL]

Attest:

GERALD J. MOSSINGHOFF

Attesting Officer     Commissioner of Patents and Trademarks